May 10, 1927.  1,627,699

F. C. GRISWOLD ET AL

GAUGING MACHINE

Filed Aug. 27. 1924   3 Sheets-Sheet 1

INVENTORS:
FRED C. GRISWOLD
WILLIAM H. CHAPMAN
BY
THEIR ATTORNEY

May 10, 1927.

F. C. GRISWOLD ET AL 1,627,699

GAUGING MACHINE

Filed Aug. 27, 1924    3 Sheets-Sheet 2

INVENTORS:
FRED C. GRISWOLD
WILLIAM H. CHAPMAN
BY
THEIR ATTORNEY

Patented May 10, 1927.

1,627,699

UNITED STATES PATENT OFFICE.

FRED C. GRISWOLD, OF NEWARK, AND WILLIAM H. CHAPMAN, OF MONTCLAIR, NEW JERSEY, ASSIGNORS TO GENERAL MOTORS CORPORATION, OF DETROIT, MICHIGAN, A CORPORATION OF DELAWARE.

GAUGING MACHINE.

Application filed August 27, 1924. Serial No. 734,369.

This invention relates to gauging machines and is herein shown as embodied in a machine for gauging the lengths of cylindrical rollers and separating those of acceptable size from the others.

Rollers that are assembled in a cage for a roller bearing must conform to certain tolerances and various methods of gauging have been employed. Calipering by hand is too slow and prior machines for the purpose have been too complicated, expensive, and uncertain in action. It is accordingly an object of this invention to provide a simple machine for accurately and speedily gauging articles, such as cylindrical rollers. Another object is to provide a machine for gauging articles automatically and separating those of acceptable size from the others. Another object is to produce an improved method of gauging articles and segregating them in accordance with their sizes.

To these ends and also to improve generally upon devices of the character indicated our invention consists in the various matters hereinafter described and claimed.

Referring to the drawings, Figure 1 is a front elevation.

Figures 1, 2:
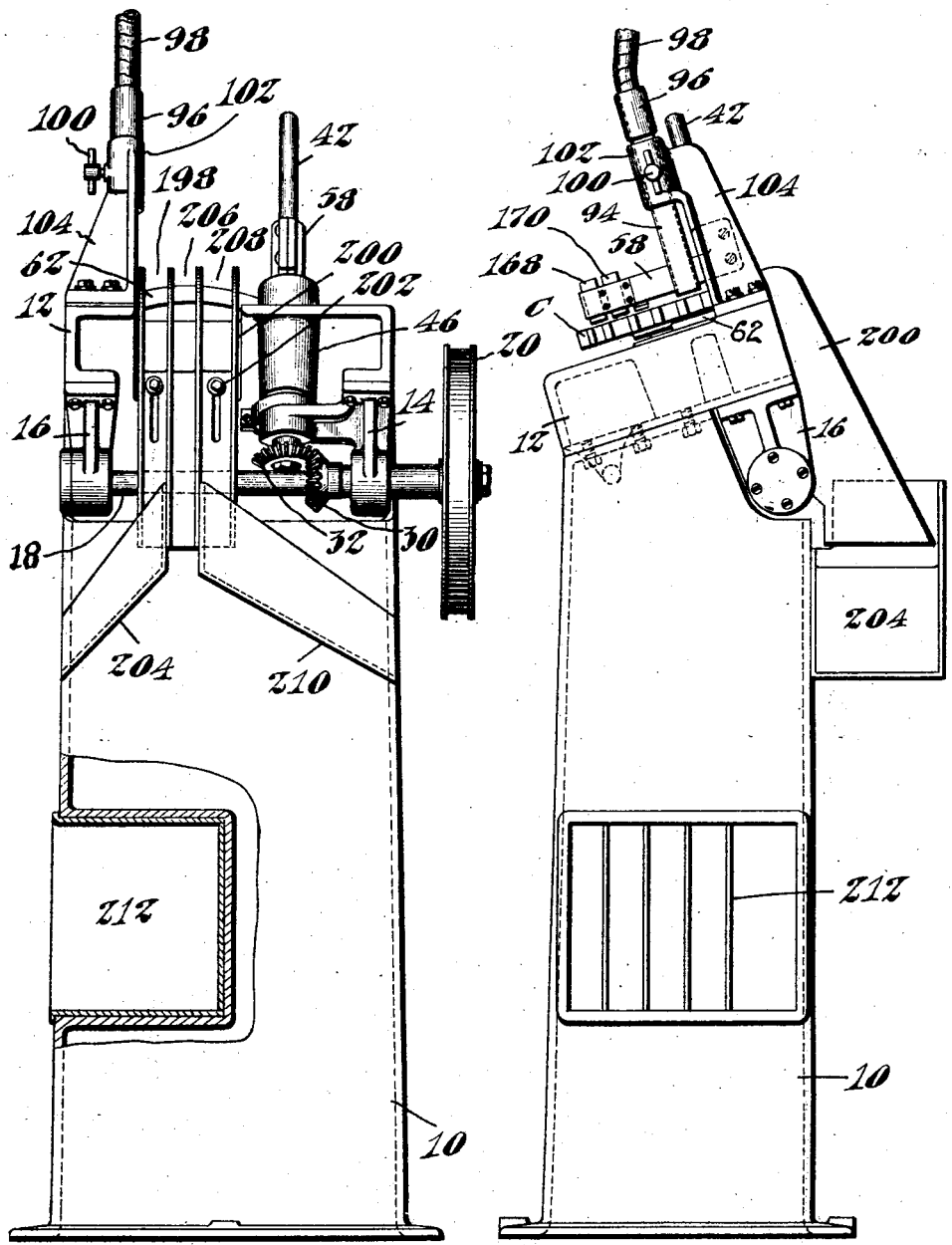
Figure 2 is a side elevation.

The articles to be gauged are fed endwise in a stream against a gauge plate and then carried successively and intermittently across the gauge plate by a rotary carrier having work receiving notches. During the traverse across the gauge plate, the articles are selectively knocked off by a rotary arm which moves parallel to the gauge plate and carries a set of gauge blades fixed at different distances from said plate, a set of chutes receiving the articles and segregating them in accordance with the particular point at which they are expelled.

The numeral 10 indicates a pedestal to which a gauge frame 12 is bolted in an inclined position, the delivery side being highest and at the front. Depending brackets 14 and 16 on the frame 12, rotatably support a horizontal drive shaft 18 driven by a belt pulley 20. The shaft is journalled in ball bearings 22 and 24 carried in recesses of the brackets and protected by dust caps 26 and 28. A bevel gear 30, keyed to the shaft, drives a bevel gear 32 fixed to an upright stub shaft 34 journalled in ball bearings 36, 36 in a bracket arm 38. The stub shaft is connected by a coupling 40 to a driven shaft 42 journalled in ball bearings 44 and 46 in a hollow boss 48 of the frame. A threaded cap 50 closes the lower end of the boss 48 and secures in place the outer thrust ring of the ball bearing 44. The two inner race rings are clamped on the shaft by a nut 52 and are spaced apart by a sleeve 54. A threaded cap 56 closes the upper end of the hollow boss 48 and adjusts the outer race ring of the bearing 46. A rotary gauge arm or holder 58 is splined to the upper end of the shaft 42 and has its end split so that it can be clamped in adjusted position by clamping screws 60. The end of the gauge arm or holder carries the gauges which are hereinafter described.

Figure 3:
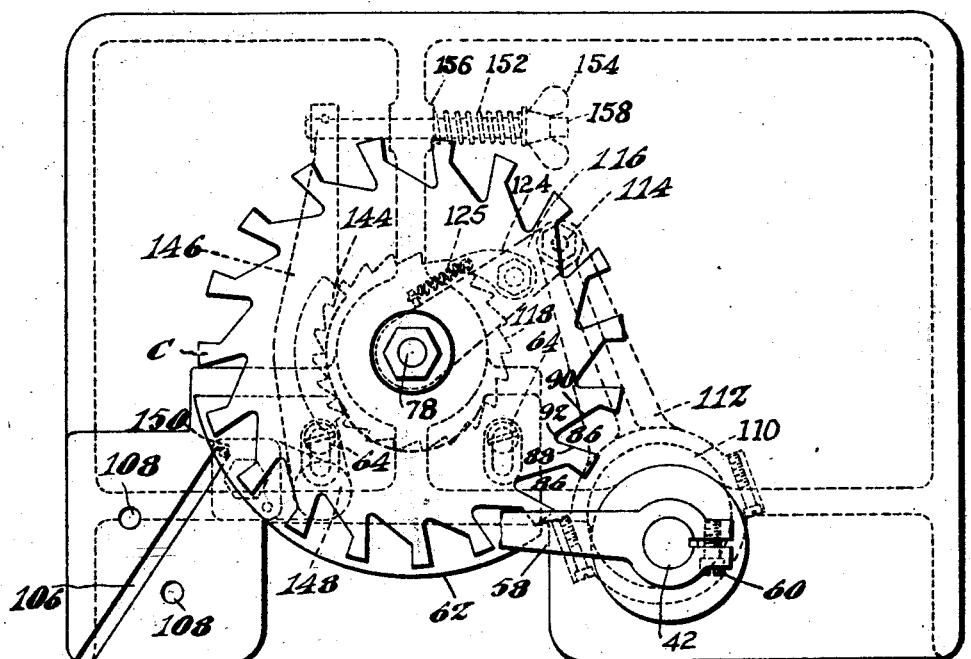
Figure 3 is a plan view with some parts removed and with the gauge arm broken away.
Figure 4:
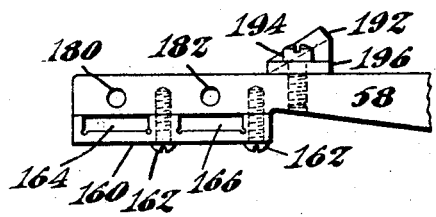
Figure 4 is a plan view of a detail.
Figure 5:
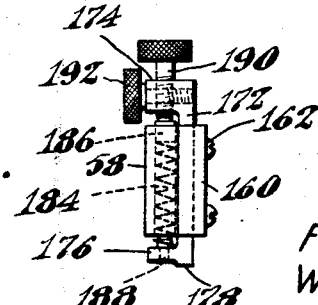
Figure 5 is an end view of the gauge.
Figure 6:
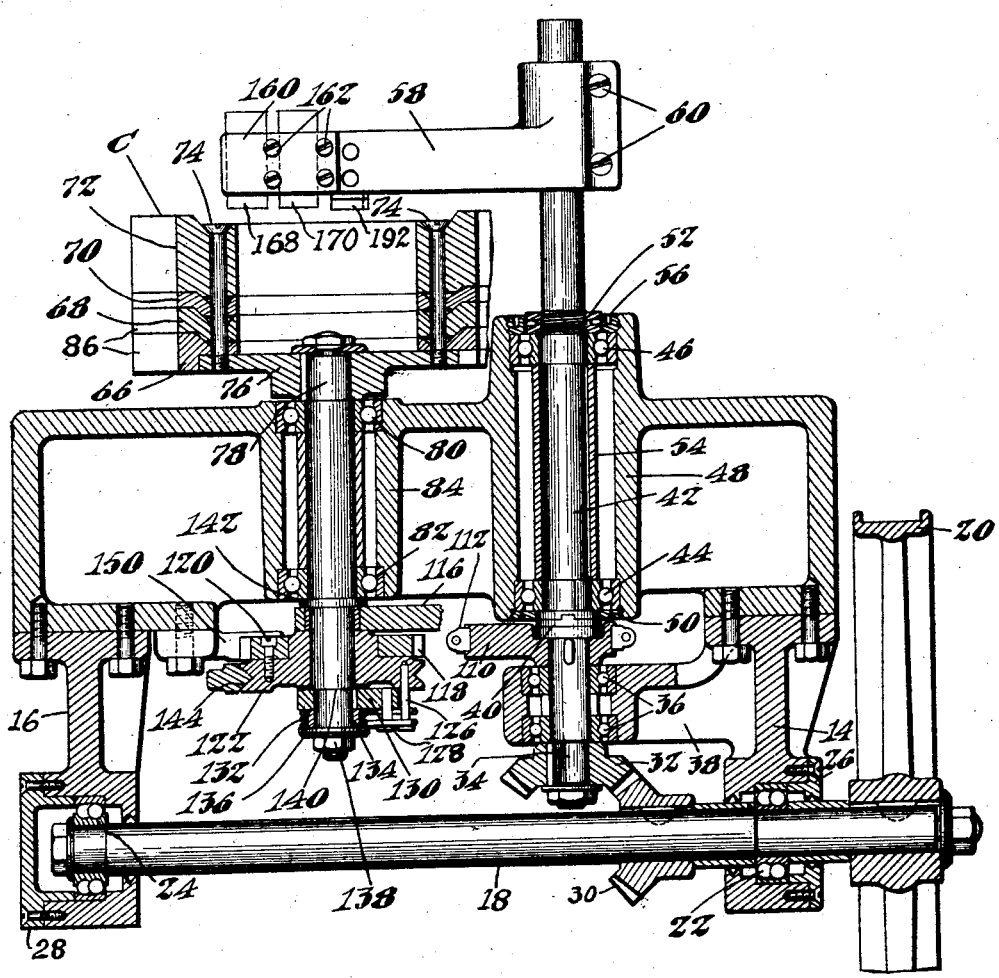
Figure 6 is a vertical section of the machine with some parts removed and with the carrier and gauges arranged to test long articles.

As shown in Figure 3, a smooth gauge plate 62 is adjustably fastened to the frame 12 by clamping screws 64 passing through slots in the plate. The plate 62 is in a plane at right angles to shaft 42 and is inclined downwardly towards the rear and supports the articles while they are carried successively across it by a rotary carrier C. The carrier may be built up in one or more sections 66, 68, 70 and 72 which vary in thickness, so that different combinations may be selected to correspond to the average length of the articles. The sections are fastened by screws 74 to a disc or holder 76 keyed to a shaft 78 which is journalled in ball bearings 80 and 82 in a hollow boss 84 of the frame 12. Each carrier section has a series of registering article receiving notches or holding means 86 which preferably slant backwardly and have converging sides 88 and 90 connected by a curved portion 92. The articles are held in the notches under the influence of gravity, due to the inclination of the gauge plate.

The articles are delivered successively to the carrier C from a tube section 94 coupled at 96 to a flexible tube 98 down which the articles are fed in a stream. The tube section 96 can be adjustably clamped by a hand screw 100 to a boss 102 on a bracket 104, to locate the lower end of the tube section a sufficient distance above the gauge plate to allow the longest articles to be delivered to the carrier and to be carried off sidewise by the latter. The bracket 104 has a guide rib (not shown) on its base fitting an oblique slot 106 in the gauge frame 12 and can be clamped in adjusted position by clamping screws passing through parallel, oblique slots (not shown) in its base and entering openings 108 in the gauge frame. After the foremost article in the tube section 96 has dropped into one of the notches 86 with its end in contact with the gauge plate 62, it is moved sideways by intermittent movement of the carrier and, meanwhile, the next article rests against the carrier and is supported by it until the next notch comes under the tube section. The carrier and the gauge arm or holder rotate in planes parallel to the inclined gauge plate.

The carrier is intermittently turned, one notch for every complete rotation of the gauge arm 58, by the following mechanism. An eccentric 110, keyed to the stub shaft 42, has the outer end of its strap 112 pivoted at 114 to a ratchet arm 116 loosely journaled on a bushing surrounding the shaft 78. A ratchet 118 is fastened by screws 120 to a brake drum 122 which is loosely journalled on the shaft. A pawl 124, pivoted on the under side of the ratchet arm, is constantly pressed against the ratchet teeth by a spring 125. A pin 126 depending from the brake drum is placed in radial alignment with a shorter pin 128 depending from an arm 130 keyed to the shaft 78 under the brake drum. The pins are yieldably coupled by a spring 132 coiled around a sleeve 134 on the shaft and having its ends bent outwardly to cross one another and to enclose the two pins between them. Hence, rotary movement of the brake drum 122 yieldingly drives the arm 130 and the shaft and carrier. A washer 136 and nut 138 clamp the sleeve 134 and arm 130 against a shoulder 140 on the shaft and the brake drum and ratchet arm are loosely confined between the arm 130 and a collar 142 on the shaft. Overrunning of the shaft and carrier is prevented by a brake shoe 144 on an arm 146 pivoted at 148 on a bracket 150 attached to the gauge frame. The brake shoe is pressed against the brake drum by a coil spring 152 interposed between a web member 156 and a hand nut 154 adjustable on a threaded rod 158 fastened to the brake arm and loosely passing through an opening in the web member.

The gauge arm carries one or more gauges, there being shown herein three gauges, two of which are alike. A guide plate 160 having three projecting lugs is fastened by screws 162 to the front of the gauge arm at the end, thereby forming two vertical guide slots 164 and 166. Gauges 168 and 170 are slidable in the slots at right angles to the gauge plate 62, and each comprises a body portion 172, a split top lug 174, a bottom lug 176, and a gauge blade 178. The gauge arm 58 has two vertical bores 180 and 182, each housing a spring 184 bearing at one end against the bottom lug 176 and at the other end against a plug 186 having a press fit in the bore. The lower end of the spring is retained by a guide pin 188 fastened in the lower lug. The downward movement of each gauge is limited by an adjusting screw 190 threaded in the upper lug 174 and bearing against the plug 186. A hand screw 192 clamps the screw 190 in adjusted position. Thus, the gauge is yieldingly pressed downwardly as far as it will go but can give upwardly, if an article becomes tilted below it. That gauge blade at the end of the arm is adjusted to such a distance above the gauge plate 62 that every article which is longer than acceptable length will be knocked off the carrier towards the front as the gauge arm revolves. The next gauge blade is adjusted to such a distance above the gauge plate that every article which is shorter than acceptable length will be ignored or cleared by it as the gauge arm revolves. If the article is of acceptable length, however, it is knocked off by this blade. In other words, the first and second blades are set for maximum and minimum lengths.

A third gauge blade 192 is attached to the gauge arm by a screw 194. The blade is near enough to the gauge plate 62 to be sure to knock off all the short rollers. It comprises the blade portion 192 which is inclined to its attaching portion 196 in order to deliver its blow directly outwards with respect to the notches in the carrier.

The long articles are delivered into the left passage 198 of a partitioned chute 200 adjustably fastened to the frame by screws 202 passing through slots in the chute. The long articles then slide into an auxiliary chute 204 which conducts them to a receptacle at one side of the machine. The acceptable articles are delivered down the central passage 206 to the front, and the short articles slide down the right passage 208 and are conducted by the auxiliary chute 210 to the right of the machine. When articles of a less average length are to be tested, one or more of the upper carrier sections 68, 70 or 72 may be removed and stored in a partitioned rack 212 set into a recess of the pedestal. The gauge arm 58 is then lowered a corresponding distance on the shaft 42. The blades are spaced apart along the gauge arm a distance equal to the spacing of the notches.

As the articles are fed successively into the notches of the carrier C they are intermittently moved, sidewise, in spaced relation, over the gauge plate. Their lower ends are thus supported in the same plane and the spaced gauging blades or tools on the gauge arm move parallel to this plane. Inasmuch as the blades are successively closer to the gauge plate, the longer articles are knocked off after a shorter traverse and this expulsion of the articles at different points segregates them in accordance with their lengths.

Although the invention has been described by reference to a specific machine and certain specified steps, it should be understood that, in its broader aspects, the invention is not necessarily limited to the specific machine and steps herein selected for illustration.

We claim:

1. In apparatus of the character described, a gauge plate, means for moving articles along said gauge plate, and a gauge blade movable parallel to said gauge plate at a predetermined distance therefrom to expel articles that exceed a predetermined dimension; substantially as described.

2. In apparatus of the character described, a gauge plate, means for moving articles along said gauge plate, a gauge blade movable parallel to said gauge plate at a predetermined distance therefrom, and a second gauge blade movable parallel to said gauge plate at a shorter distance therefrom; substantially as described.

3. In apparatus of the character described, a gauge plate, means for moving articles successively, in spaced relation, along said gauge plate, a gauge holder, a plurality of spaced blades carried by said holder at different distances from the gauge plate, and means for moving the holder parallel to said gauge plate to expel articles at different points of traverse in accordance with their dimensions; substantially as described.

4. In apparatus of the character described, a gauge plate, means for moving articles successively, in spaced relation, sidewise, with their ends resting on said gauge plate, a gauge holder, means for moving the holder parallel to said gauge plate, gauge blades carried by said holder in spaced relation for simultaneous action on different articles, said gauge blades having their paths of travel successively closer to said gauge plate to expel articles at different points in accordance with their lengths; substantially as described.

5. In apparatus of the character described, a gauge plate, means for moving articles along said gauge plate, a gauge holder pivoted to swing on an axis at right angles to said gauge plate, and a gauge blade carried by said holder at a predetermined distance from the gauge plate; substantially as described.

6. In apparatus of the character described, a gauge plate, a carrier having article holding means, means for rotating the carrier to traverse the articles over the gauge plate, a gauge holder, means for moving the gauge holder parallel to said gauge plate, and a gauge blade carried by said holder at a predetermined distance from said gauge plate; substantially as described.

7. In apparatus of the character described, a gauge plate, a carrier having article holding means, means for rotating the carrier to traverse the articles over the gauge plate, a gauge holder pivoted to swing on an axis at right angles to said gauge plate, and a gauge blade carried by said holder at a predetermined distance from said gauge plate; substantially as described.

8. In apparatus of the character described, a gauge plate, an article carrier for traversing articles over the gauge plate, a gauge holder pivoted to swing on an axis at right angles to the gauge plate, and gauge blades carried by the gauge holder at different distances from the gauge plate; substantially as described.

9. In apparatus of the character described, a gauge plate, an article carrier, means for intermittently rotating the carrier for traversing the articles successively over the gauge plate, a gauge holder pivoted to swing on an axis at right angles to the gauge plate, and gauge blades carried by the gauge holder at different distances from the gauge plate; substantially as described.

10. In apparatus of the character described, a gauge plate, a rotary carrier having article receiving notches in its periphery, means for supplying articles successively to the notches, means for rotating the carrier to traverse the articles over the gauge plate, a gauge holder having a plurality of gauge blades, and means for moving the gauge holder over the carrier to expel the articles; substantially as described.

11. In apparatus of the character described, a carrier having article holding means, means for actuating the carrier, a gauge blade, and means for moving the blade over the carrier in a plane parallel to the path of travel of the carrier; substantially as described.

12. In apparatus of the character described, a rotary carrier having article holding means, means for rotating the carrier, a gauge holder mounted to move over the carrier in a plane parallel thereto, and a plurality of gauge blades carried by the holder at different distances from the carrier substantially as described.

13. In apparatus of the character described, a gauge plate a carrier having in its edge open-ended article receiving notches for traversing the articles over the gauge plate, and means for knocking those articles, which exceed a predetermined dimension, out of the open-ended notches in the carrier; substantially as described.

14. In apparatus of the character described, an inclined gauge plate, a carrier movable parallel to the gauge plate and having article receiving notches for traversing the articles over the gauge plate, and means for knocking the articles out of the notches of the carrier, at different points, in accordance with their lengths; substantially as described.

15. In apparatus of the character described, a gauge plate, a carrier having article holding means for traversing the articles over the gauge plate, means for knocking the articles out of the carrier, at different points, in accordance with their lengths, and means for segregating the articles; substantially as described.

16. In apparatus of the character described, an inclined gauge plate, a rotary carrier parallel to the gauge plate and having article receiving notches for traversing the articles over the gauge plate, means for supplying articles successively to the notches on the higher side of the carrier, a gauge blade, and means for moving the gauge blade over the carrier to expel articles which exceed a predetermined dimension from the notches; substantially as described.

17. In apparatus of the character described, a gauge plate, a rotary carrier having article receiving notches in its periphery, a feed tube terminating over said carrier in the path of travel of said notches for supplying articles endwise thereto, means for rotating said carrier, and means for expelling articles from said carrier and segregating them in accordance with their lengths; substantially as described.

18. In apparatus of the character described, a gauge plate, a gauge holder movable parallel to the gauge plate, means for adjusting the distance of the gauge holder from the gauge plate, and a rotary article carrier having registering sections of different thicknesses; substantially as described.

19. In apparatus of the character described, a gauge plate, a shaft at right angles to the gauge plate, a gauge holder splined to said shaft, means for adjusting the distance of said gauge holder from the gauge plate, and a rotary article carrier between said gauge plate and gauge holder, said carrier being built up of sections of different thicknesses; substantially as described.

20. In apparatus of the character described, a gauge plate, a carrier for traversing articles over the gauge plate, means for actuating the carrier, a gauge holder movable over the carrier, a gauge blade carried by the holder, and means for adjusting the gauge blade towards or from the gauge plate; substantially as described.

21. In apparatus of the character described, a gauge plate, a carrier for traversing articles over the gauge plate, a gauge holder pivoted to swing parallel to said gauge plate, a gauge blade, and means for yieldably mounting said gauge blade on its holder; substantially as described.

22. In apparatus of the character described, a gauge holder, a gauge blade slidably mounted on said holder, an adjusting screw for limiting the movement of said blade in one direction, and a spring for yieldingly holding said blade at its limit of movement; substantially as described.

23. In apparatus of the character described, a frame, parallel shafts journalled in said frame, an article carrier fixed to one of said shafts, a gauge holder fixed to the other of said shafts and arranged to sweep over the carrier, means for rotating said other shaft, and means for yieldingly rotating the first shaft; substantially as described.

24. In apparatus of the character described, a frame, parallel shafts journalled in said frame, an article carrier fixed to one of said shafts, a gauge holder fixed to the other of said shafts and arranged to sweep over the carrier, means for rotating said other shaft, and means for intermittently rotating the first shaft from said other shaft; substantially as described.

25. In apparatus of the character described, a gauge plate for supporting an article, a gauge blade movable parallel to said gauge plate at a predetermined distance therefrom, and a second gauge blade movable parallel to said gauge plate at a shorter distance therefrom; substantially as described.

26. In apparatus of the character described, a gauge plate for supporting a plurality of articles, a plurality of gauge blades movable parallel to said gauge plate at different distances therefrom, and means for actuating the blades to expel the articles from the gauge plate in accordance with their dimensions; substantially as described.

27. In apparatus of the character described, a gauge plate for supporting a plurality of articles in spaced relation, a gauge holder, a plurality of gauge blades carried by the holder at different distances from the gauge plate, and means for causing the blades to cooperate successively with the articles; substantially as described.

28. The method of gauging articles for length which consists in moving the articles in spaced relation, with their lower ends lying in the same plane, and moving spaced gauging tools parallel to said plane at different distances therefrom to expel the articles at different points and segregate them in accordance with their lengths; substantially as described.

29. The method of gauging articles for length which consists in supporting the articles on end, and moving gauging tools in planes parallel to said ends of the articles at different distances from said ends to segregate the articles in accordance with their lengths; substantially as described.

30. In apparatus of the character described, a gauge plate, a carrier for moving articles over said gauge plate with the ends of said articles resting on said plate, and a plurality of gauge blades at different distances from the gauge plate for removing the articles from the carrier, at different points, in accordance with their lengths; substantially as described.

31. In apparatus of the character described, a rotary carrier having article holding means, means for actuating the carrier to move the articles in a predetermined path, and a plurality of gauge blades having their edges parallel to the carrier at different distances therefrom to remove the articles, at different points, in accordance with their lengths; substantially as described.

In testimony whereof we hereunto affix our signatures.

FRED C. GRISWOLD.
WILLIAM H. CHAPMAN.